United States Patent [19]

Ramsey et al.

[11] Patent Number: 4,783,096

[45] Date of Patent: Nov. 8, 1988

[54] STACKED AIRBAG WHEELED VEHICLE SUSPENSION SYSTEM

[75] Inventors: John E. Ramsey, Canton; Ervin K. VanDenberg, Massilon, both of Ohio

[73] Assignee: The Boler Company, Itasca, Ill.

[21] Appl. No.: 936,638

[22] Filed: Nov. 25, 1986

[51] Int. Cl.[4] .......................... B60J 9/10; B60G 11/26
[52] U.S. Cl. ................................. 280/711; 280/405 R; 280/81 R
[58] Field of Search ............... 280/688, 712, 713, 711, 280/693, 81 R, 81 A, 661, 405 R, 405 A, 715

[56] References Cited

U.S. PATENT DOCUMENTS

| | | | |
|---|---|---|---|
| 3,256,028 | 6/1966 | Fehlberg | 280/661 |
| 3,290,056 | 12/1966 | Smith | 280/711 |
| 3,332,701 | 7/1967 | Masser | 280/713 |
| 3,704,896 | 12/1972 | Buelow | 280/81 A |
| 3,895,818 | 7/1975 | Fearon | 280/81 R |
| 3,902,734 | 9/1975 | Fier | 280/799 |
| 3,912,293 | 10/1975 | Harbers | 280/81 R |
| 4,082,305 | 4/1978 | Allison et al. | 280/81 R |
| 4,084,833 | 4/1978 | Mohrbacker et al. | 280/81 A |
| 4,162,090 | 7/1979 | Schwartz | 280/688 |
| 4,261,597 | 4/1981 | VanDenberg | 280/688 |
| 4,504,079 | 3/1985 | Strong | 280/711 |
| 4,552,379 | 11/1985 | Foster | 280/661 |

OTHER PUBLICATIONS

Lange's Hi-Steer Model 6001.

"Bridgemaster" model by McNeilus Truck & Mfg. Granning Suspension, Inc. TX-3000.

Primary Examiner—Richard A. Bertsch
Attorney, Agent, or Firm—Hall, Myers & Rose

[57] ABSTRACT

An air ride suspension system having very high (height) carrying and/or lift capabilities includes a pair of stacked, expandable airbags connected to the frame of a wheeled vehicle such that there is a lower beam for supporting the stack and an intermediate beam with plate member for stabilizing the connection between the stacked airbags. The frame of the vehicle can serve as the upper support for the stack, or optionally, a separate third beam may be used therefor. There is provided in a further embodiment on the lower beam a unique caster adjusting feature comprised of an adjustable radius rod, and a pivot pin connection, attached to the axle in such a way that adjustment of the radius rod pivots the axle orientation about the pivot pin, thus adjusting caster. In a further unique embodiment the lower beam comprises a pivot connection, a generally C-shaped beam comprised of two longitudinal legs and a lateral plate member joining the legs, and a rearwardly extending futher plate member connected at one end to the lateral plate and at the other end pivotally connected to the axle. This latter beam is useful for suspensions generally, and provides both roll flexibility and lateral control through the use of a resilient bushing which forms the connection between the plate member and the axle.

19 Claims, 3 Drawing Sheets

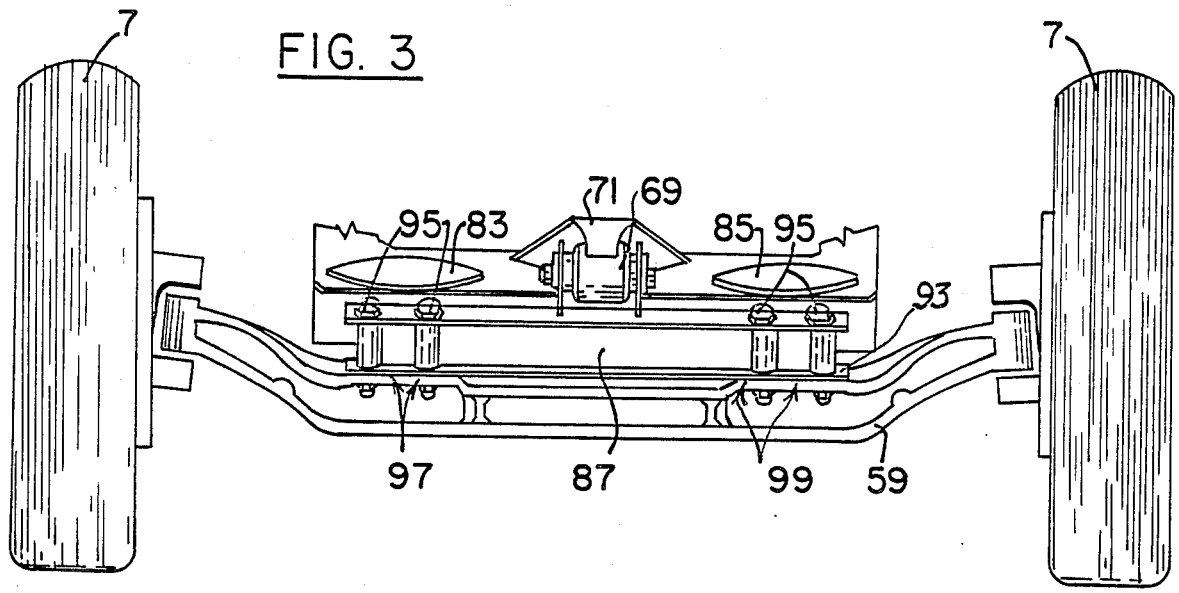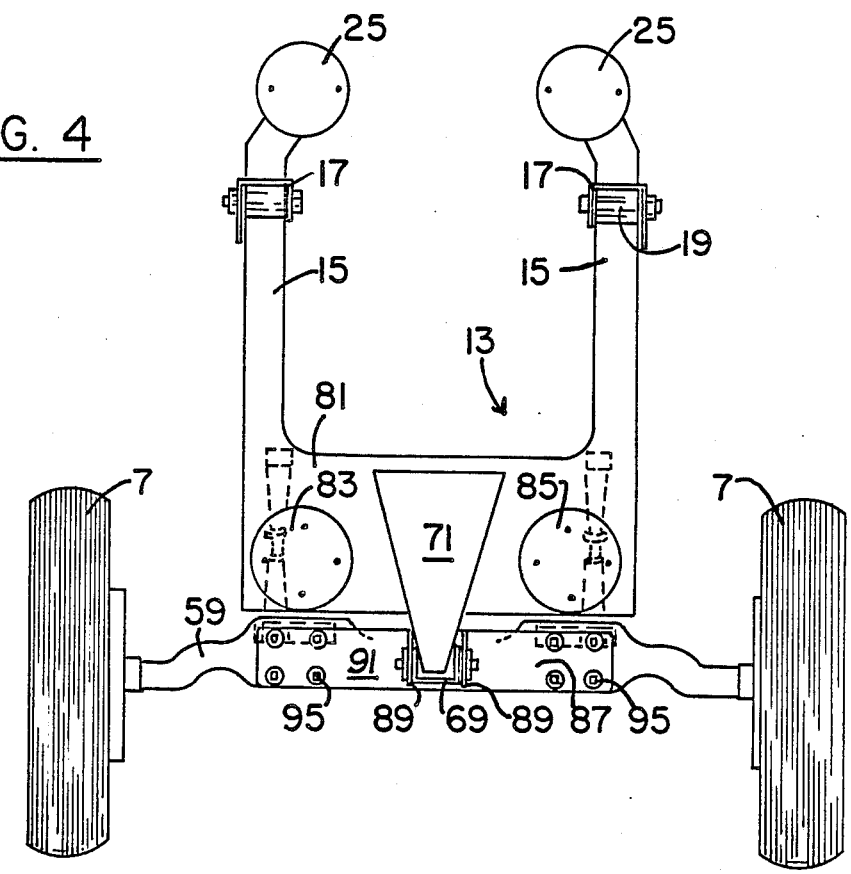

STACKED AIRBAG WHEELED VEHICLE SUSPENSION SYSTEM'

TECHNICAL FIELD

This invention relates to wheeled vehicle suspension systems. More particularly, this invention relates to wheeled vehicle suspension systems which have a high lift height capability, or even in the absence of a lift mechanism, have the ability to be used under high framed vehicles.

BACKGROUND OF THE INVENTION

Numerous vehicles have been used industrially which either have very high frames or which require high lift height capabilities when a lift axle suspension system is employed. Military vehicles, for example, can often have longitudinal frames which far exceed the ordinary height levels experienced on most commercial vehicles, and thus require special suspension systems extending between the frame member and the axle. In the private commercial field, an excellent example of a vehicle requiring high lift capabilities, particularly in the tag (behind the drive axle) position, is a cement mixer truck. It is known that such trucks may advantageously use a lift axle suspension system which extends beyond the rearward extremity of the longitudinal frames of the vehicle, thereby to provide a tag axle for lowering into engagement with the road surface when the cement mixer is loaded, but which may be raised beyond the level of the vehicle's frame.

Examples of cement mixers using tag axles in the aforementioned position include such patents as U.S. Pat. Nos.:
3,704,896
3,895,818
4,082,305
4,084,833
(See also the "Bridge Master" model by McNeilus Truck & Mfg. Inc. of Dodge Center, Mn.)

Tag axles of the type described are useful in that they allow additional weight carrying capacity in the vehicle, thus allowing maximized loads to be hauled. And, when such suspension systems are provided with lifting capabilities, the systems may be raised from the roadbed to provide maximized weight transfer to the drive axles for tractive effort.

Whether referring to specialized vehicles with high frames (the axle being used in any position, pusher, drive or tag) or whether referring to commercial vehicles wherein there is a need for an axle where high lifting capabilities are either desirable or necessary, there exists in the current technology a limitation on the travel that can be achieved. This is because the airbags (also referred to as air springs) are resilient, expandable members designed to carry a certain load in accordance with their cross-sectional area. If expanded too much, this decreases the safe load for which they were originally designed to carry because elongation decreases the effective cross-sectional area.

Given known commercial airbags of conventional design, the usual situation is that they can achieve somewhere between about 12-15 inches of travel when safely carrying a load of approximately 14,000 pounds. After this, the airbags narrow in diameter upon further expansion, to a point where their effective cross-sectional area becomes less than that desired for carrying the load. Where one desires more than 15 inches of travel, therefore, and particularly in those instances where upwards of approximately 30 inches of travel are desired for carrying loads of approximately 14,000 pounds, such axle suspension systems heretofore known, could not generally be used with maximized safety.

Concurrent with such problems in the industry, was a problem somewhat ubiquitous throughout the entire axle suspension field in commercial and other heavy duty trucks. This was the general inability to provide a convenient way in which to adjust caster on such vehicles. The problem was that such systems were usually of a trial and error type requiring either complex mechanisms on the one hand, or mechanical wedging devices on the other. An example of the latter can be found in the Lange High-Steer Model 6001 suspension system.

Further, and concurrent with the above, was the general need in the heavy duty trucking field for a beamtype suspension system capable of connecting an axle to the frame member of the vehicle, which provided both roll flexibility and lateral stability. Heretofore, it was felt that these two characteristics; namely, roll flexibility and lateral stability, conflicted in that it was previously believed that in order to design a suspension system properly, an engineering tradeoff had to be made between one characteristic and the other. Thus, suspension systems heretofore designed were often compromised below maximized roll flexibility in order to get appropriate lateral stability and vice versa.

The subject invention successfully solves the above-described problems in the art by providing a unique suspension system containing stacked airbags which are stabilized at their juncture to provide the desired safe ride characteristics, while achieving heights, including liftable heights, of up to about 30 inches. In addition, there is provided a unique and simple caster adjusting mechanism, as well as a unique beam-type suspension system capable of use in the overall suspension of this invention, but also useful in other suspensions, which achieves both roll flexibility and lateral stability without engaging in undue tradeoffs.

SUMMARY OF THE INVENTION

One object of this invention, as aforementioned, is to achieve for vehicles of high frame heights or for vehicles needing high lift capabilities, particularly in the tag position, a suspension system either of a nonlift or liftable type which can safely carry loads, particularly on the order of about 14,000 pounds, and yet attain the height requirements desired. This objective is achieved by the subject invention through the provision of an axle suspension system for a frame-membered wheeled vehicle comprising a first beam, a second beam, a first expandable airbag, and a second expandable airbag; means for pivotally connecting the first beam to a frame member of the vehicle, means for connecting an axle to said first beam, and means for connecting a first expandable airbag to said first beam; means for connecting one end of a second expandable airbag to a frame member of the vehicle; said second airbag being located above said first airbag such that said first and second airbags extend between said first beam and said frame member of said vehicle, said first and second airbags being connected by a stabilizing means comprising a member connecting said first and second airbags together, and said second beam being connected to said connecting member, said second beam being provided with means for pivotally connecting said beam to a frame member of said vehicle.

As another objective, a unique caster alignment device is provided for use in suspension systems generally, or in combination with the unique suspensions of this invention, including the unique suspension system described immediately hereinabove. This is accomplished by providing in a suspension system for connecting an axle to a frame member of a wheeled vehicle and for adjusting the caster of the axle of the vehicle, said system comprising a beam, an axle connected to said beam, and means for pivotally connecting one end of said beam to a frame of the vehicle, the improvement comprising an axle connecting member comprising means for pivotally connecting the beam to a first portion of said axle, a radius rod pivotally connected at one end to said beam and at the other end to a second portion of said axle, said radius rod being provided with means for adjusting its length, whereby adjustment of the length of said radius rod changes the caster of said axle.

There is further provided as another objective of this invention a unique beam-type suspension system capable of use in a wide variety of suspensions, not necessarily for use in the above-described invention where high lift or high frame carrying capabilities are achieved. Such is achieved through the use of a unique beam in a beam-type suspension system for connecting an axle to the longitudinal frame members of a wheeled vehicle which includes a beam pivotally connectable at one end to its respective frame member of the vehicle and having located along its length an expandable airbag system for connection at its upper end to a respective frame member of the vehicle, and being provided with a means for connecting the axle to said beam, the improvement comprising as said unique beam structure, first and second longitudinal beam members, each provided at one end with means for resiliently connecting said beam to a respective frame member of the vehicle, a first lateral beam member extending between said longitudinal beams, said lateral beam member providing a platform upon which said airbag system resides, and an axle connecting means comprising a third longitudinal beam member connected at one end to an intermediate portion of said first lateral beam member, and at the other end to said axle by an axle connection means which comprises a resilient pivotal bushing connected to a second lateral beam which is attached at spaced locations to said axle. By providing such a beam construction for wheeled vehicle suspensions generally, there is provided a beam-type suspension which is both roll flexible, yet laterally stable.

This invention will now be described with respect to certain embodiments thereof, as illustrated in the following drawings.

BRIEF DESCRIPTION OF THE DRAWINGS

FIG. 3 is a partial, rear plan view of the embodiment shown in FIGS. 1-2.

FIG. 4 is a partial top plan view of the lower beam and axle connection members shown in FIGS. 1-3.

DETAILED DESCRIPTION OF CERTAIN EMBODIMENTS OF THE INVENTION

Figure 1:
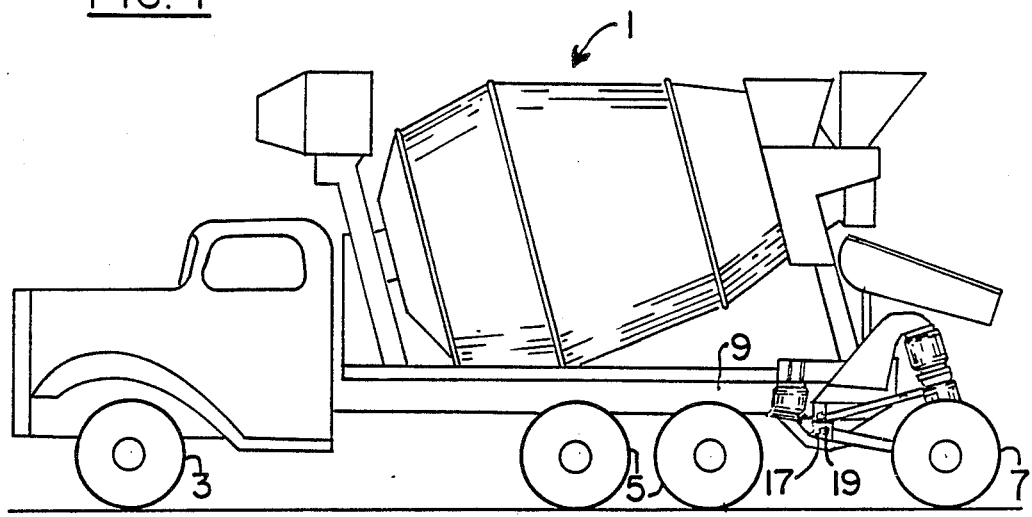
FIG. 1 is a side plan view of an embodiment of this invention used in the tag position on a typical cement mixer truck.

With reference now to FIG. 1, there is illustrated a typical cement mixer truck 1 having forward steering wheels 3 and tandem wheels 5, forming the primary means of support for the cement mixer truck 1. Tandem wheels 5 may be individually suspensioned, or they may be joined by a tandem suspension, such that one or both of the sets of wheels 5 may be a drive axle. Wheels 5 may be singles or duals.

Located behind tandem wheels 5 are wheels 7. (It is understood, of course, that the right side of the truck is the same as the left side of the truck as shown.) Wheels 7 are connected to the longitudinal frame member of the vehicle 9 by a unique lift axle suspension system which forms one embodiment of the subject invention. This unique axle suspension system is best illustrated in FIGS. 2-7. It is understood that while wheels 7 are shown as single wheels, they could be dual wheels (two per side) using conventional dual wheels or rims to accomodate, in known fashion, two tires at each end of the axle.

Figure 2:
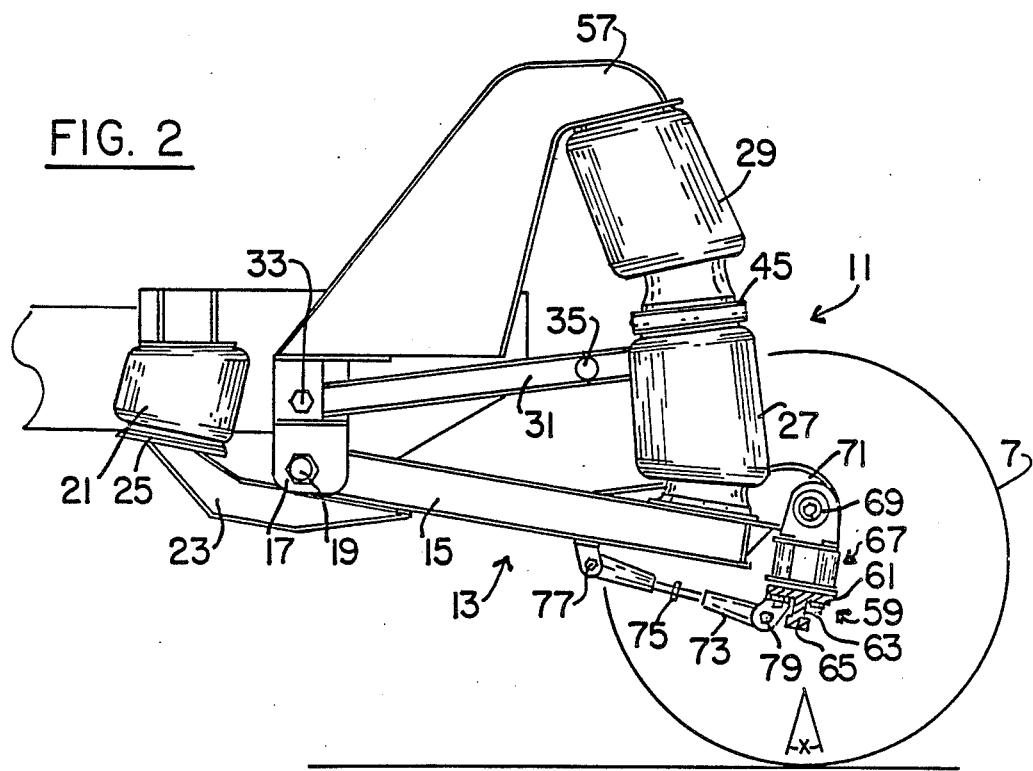
FIG. 2 is a partial side plan view of the suspension system used in the tag position as shown in FIG. 1.

With reference to FIG. 2, unique lift axle suspension system 11 is comprised of a lower beam structure 13 of a generally C-shaped configuration when viewed from above (as best shown in FIG. 4). This lower beam structure 13 comprises a pair of longitudinal beams 15 pivotally connected at one end to frame 9 of the vehicle. Such pivotal connections are well known in the industry and may take any one of these conventional forms. Generally speaking, however, such includes a bracket member 17 and a resilient bushing pivot pin structure 19 of known construction. Beams 15 also have connected to them at their forward lower plate end, and forward of pivot pin 19, a conventional airbag lift mechanism comprised of an airbag 21 and rocker beam 23. Airbag 21 resides on pedestal 25, as shown best in FIG. 4. Such a lift mechanism is conventional in the industry and is shown as one example of a lift mechanism that may be used. Other add-on lift mechanisms, of known construction, may be employed instead of the one shown. An example would be a coil spring and chain lift mechanism such as used in the Neway ART505B Series, or as another example, a Granning type center airbag lift, e.g. TX-3000 Model.

As can be seen, expansion of airbag 21 causes rocker beam 23 to pivot beam 15 upwardly, thus raising the suspension system 11 upwardly and thereby raising wheels 7 from road engagement. This lifting action is accomplished by inflating airbag 21 and simultaneously deflating the unique stacked airbag configuration shown in the drawings. This is accomplished by air piping and valving leading to controls in the cab of the vehicle, all being conventional and well known in the lift axle industry.

With reference to FIG. 2, there is shown a pair of stacked airbags; i.e. lower airbag 27 and upper airbag 29. Airbags 27 and 29 may be of any desired type (e.g. convoluted or rolling-lobe) and of any size to meet the desired load-carrying capacity of the vehicle. In a preferred embodiment of this invention, however, axle suspension system 11 is capable of safely carrying 14,000 pounds (i.e. GAWR) by using as conventional and available rolling lobe airbags 27 and 29 Goodyear airbags 1R14-039 or Firestone airbags W01-358-8050. In this way, there is achieved by this invention tag axle lift heights of approximately 30 inches or more for conventionally framed trucks. Such airbags, in this respect, have a nominal diameter of about 15 inches, with a collapse to about 5 inches, and an extension for load-carrying capabilities of approximately 18 inches. It is understood, of course, that the suspension may also include limit chains (not shown for convenience) extending between the axle and frame, in a conventional fashion, in order to act as a limit stop on airbag expansion.

Figure 5:
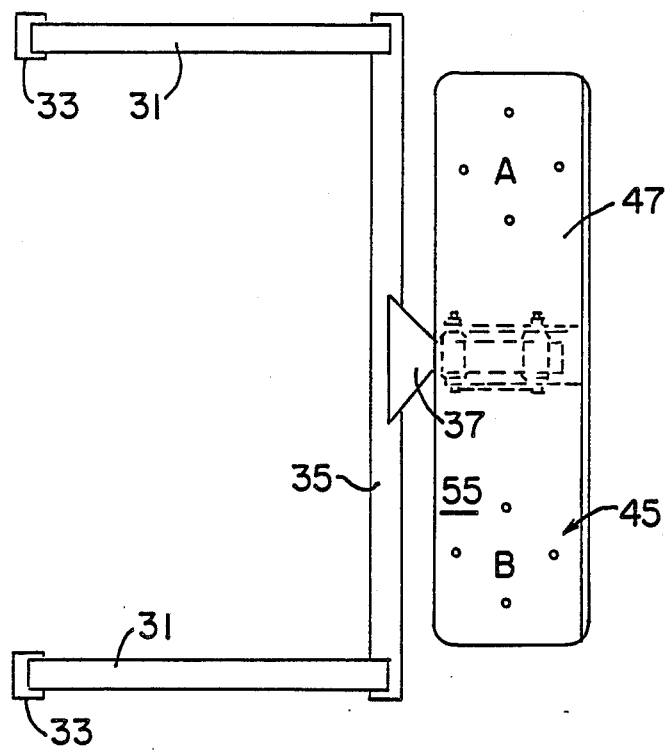
FIG. 5 is a top plan view of the stabilizing beam for the stacked airbags as shown in FIG. 2.
Figure 6:
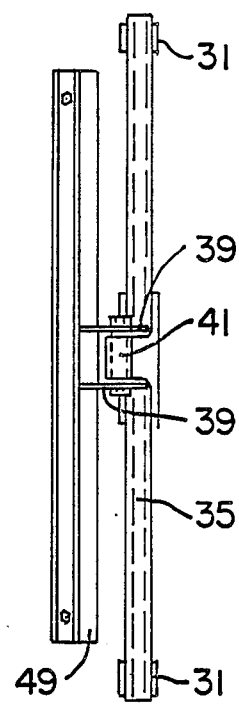
FIG. 6 is a rear plan view of FIG. 5.
Figure 7:
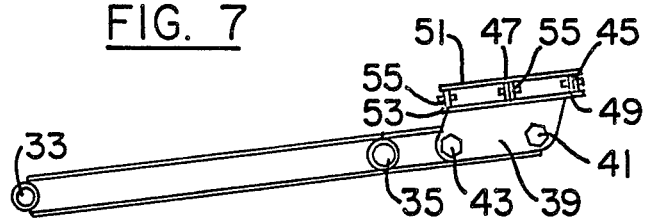
FIG. 7 is a side plan view of the stabilizing mechanism of FIG. 5.

To merely stack two airbags on top of each other would be both ineffective and dangerous. This is because airbags are inherently flexible, and thus lack stability. If, therefore, two airbags were merely stacked one on top of the other, their intermediate juncture would simply be inherently unstable and would tend to float in random directions, thus setting up the potential for catastrophic failure if used in that simple configuration. For this reason, the subject invention provides a unique stabilizing mechanism for the juncture of airbags 27 and 29, which stabilizing mechanism is best illustrated in FIGS. 5-7. Such a stabilizing mechanism comprises a pair of longitudinal beams 31 pivotally connected (usually by way of a resilient bushing) to frame member 9 of the vehicle by way of pivotal connection 33. Longitudinal beams 31 are then connected at their other end to lateral beam 35, which, in this instance, may simply be a tubular member as shown. In this respect, beams 31 are rigidly connected, as by welding, to beam 35.

Extending from the central portion of lateral beam 35 is a triangularly shaped rigid box structure 37. This box structure 37 has longitudinally extending box walls 39 which are laterally spaced so as to allow for a resilient pivotal bushing connection for platform 45 to extend therebetween. As can be seen, the pivotal connection is comprised of two resilient pin bushings 41 and 43, longitudinally spaced on from the other. Each of pivot pins 43 and 41 may, in conventional fashion, be the same type of resilient pivot pin connections used at pivot 33. By spacing pins 41 and 43 in the longitudinal direction, a significant degree of stability is achieved for the airbags by way of stabilizing platform 45 while allowing the beam to be sufficiently flexible in the "walk" mode for good ride characteristics. An example of such spacing, as well as a type of resilient pivot pin useful in the practice of this invention, is shown in U.S. Pat. No. 3,332,701.

Stabilizing platform 45 has an upper and lower surface. Upper surface 47 at positions A and B form the lower platform surface for upper airbag 29. The corresponding lower surface 49 would, of course, have similar positions A, B, but, in this respect, would form the upper platform for the upper end of lower airbag 27.

As can be seen, platform 45 is comprised of a beam structure which extends laterally between positions A and B, and is formed of upper and lower plate members 51 and 53, respectively, and cross-members 55. In this respect, by providing three cross-members 55 on each of initially manufactured plates 51 and 53, a convenient mechanism for assembling platform 45 is provided. For example, by providing lateral cross-members 55 extending the entire length (e.g. from A to B) of platform plates 51 and 53, respectively, and locating them so as to be aligned in side-by-side relationship, thereby to properly align top plate 51 with lower plate 53, when manufacturing the platform, one need only slide upper plate 51, with respect to lower plate 53, by sliding respective cross-members 55 along each other, thereby to automatically align the plate. Final welding or bolting (as shown) may then take place to complete platform 45.

Beam member 37 may be connected to platform 45 by longitudinally extending boxwalls 39 via bushed pins 41-43, and by welding to bottom plate 49. When so constructed, there is provided a safe and effective stabilizing mechanism for achieving the stacking of airbags 27 and 29, one on top of the other, thereby to achieve the unique range of high lift and/or carrying capabilities of the subject invention.

With respect to the high height carrying and/or lift capabilities as shown in the embodiment of FIGS. 1-7, there is further provided a third beam structure 57 of a generally L-shaped configuration connected at one of its ends to frame member 9 and at the other end to the top of upper airbag 29. In this way, stacked airbag configuration 27-29 is connected to the frame of the vehicle at its lower end by lower beam structure 13 and to the frame member at its upper end by beam structure 57. The entire system is then stabilized intermediate its ends by the stabilizing beam structure comprising longitudinal beam 31, lateral beam 35, box beam member 37, spaced resilient pin connection 41-43, longitudinal plates 56 and platform structure 45. When so arranged and when using the aforementioned airbags of Firestone and/or Goodyear, this structure has the capability of carrying 14,000 pounds of payload (GAWR) safely, while at the same time achieving lift heights of about 30 inches. Lifting, in this respect, is easily achieved, as aforementioned, through conventional air line construction well known in the lift axle art, such that upon expansion of conventional airbag 21, rocker beam 23 causes beam 15 to pivot about pin 19 (while airbags 27 and 29 are automatically exhausted of air), thus lifting wheels 7 the desired height above the road surface. The reverse procedure then causes wheels 7 to be lowered into engagement with the road surface, i.e. by expanding airbags 27 and 29 and deflating airbag 21 in a known way. By pressurizing bags 27-29 to an appropriate airbag pressure, wheels 7 of suspension 11 are thereby allowed to carry their fair share of the load of the vehicle in a safe and effective manner without taking too much of the weight off of the steering axle and/or drive axles to cause problems either by way of traction or safety.

Attention is now directed primarily to FIG. 2 and the unique caster alignment feature shown therein. As can be seen, in a typical lift axle suspension system of the type described, the axle employed is of a typical "I"-beam construction 59. I-beam 59 comprises an upper horizontal flange 61, a downwardly extending intermediate flange 63 and a lower, smaller flange 65. The upper surface of upper horizontal flange 61 is connected to beam 15 by way of an axle connection mechanism generally shown at 67, which, in turn, is resiliently connected via pivot pin 69 to an intermediate beam 71 (all as described more fully hereinbelow, particularly in regard to FIG. 34).

It is important for both safety and economy that the caster (i.e. angle "X") of the lift axle be adjustable. This is achieved in the subject invention by a unique yet simple device comprising a radius rod 73 of a conventional configuration (e.g. see U.S. Pat. No. 3,902,734) whose length may be adjusted by rotatable bolt-screw thread connection 75. By connecting one end of radius rod 73 pivotally at 77 to beam 15 and the other end pivotally at 79 to the lower portion of upper flange 61, a unique caster adjustment feature is provided. For example, by simply turning bolt screw thread 75 to either elongate or shorten radius rod 73, it can be seen that angle X can be changed, thus setting caster to the desired degree.

Reference is now made primarily to FIGS. 3–4 where a further unique feature of the subject invention is illustrated. This unique feature is in the nature of the lower beam structure 13. In this respect, this unique feature has applicability in a wide variety of suspensions and is not necessarily limited to use in the suspensions hereinbefore illustrated. For example, this unique beam-type suspension has unique applicability in non-lift, low frame or regular frame suspensions where additional lifting height is neither needed nor desired. Thus, it has ubiquitous applicability with, or without, lifting mechanisms 23–25 for use as a beam-type air ride suspension system.

As shown best in FIG. 4 and partially in FIG. 3, this unique beam-type suspension includes longitudinally extending beams 15, a lateral beam-like plate member 81, thereby to form in general configuration with beams 15 a generally "C"-shaped beam. Pedestals 83 and 85 may then be provided on the upper surface of beam-like plate member 81 to form platforms for resilient airbags, either of a single airbag type or stacked, as hereinbefore described. Extending longitudinally from the upper surface of lateral beam 81 is a further longitudinal beam 71 which at its rearwardmost end is connected to a conventional single pivot pin bushing 69. Pivot pin bushing 69 is then connected to axle connection beam 87 via upstanding plates 89.

Axle connection beam 87 is a laterally extending beam made up of upper lateral plate 91 and lower lateral plate 93. Such plates are journaled together by way of bolts 95 located at either end of beam 87. This beam is then connected at two spaced locations, 97 and 99, to axle 59, as by bolts 95 which extend through upper flange 61 of the axle (see FIG. 3). By the configuration shown, wherein there is provided a rigid beam-to-axle connection, as through beam 87, connection 69, beam 71, lateral beam 81, longitudinal beams 15, and frame connecting members 17, there is achieved significant lateral stability. On the other hand, through the use of conventional resilient bushings at 69 and 19, there is achieved a significant degree of roll flexibility. In this way, then, both roll flexibility and lateral stability are maximized to a very acceptable level.

Once given the above disclosure, many other features, modifications and improvements will become apparent to the skilled artisan. For example, the subject invention may be modified so as to be applicable to drive axles, rather than just axles in the pusher or tag position. Such a drive axle modification would merely provide that the lower beam structure, as well as, at times, the stabilizing beam structure, would be duplicated on either side of the vehicle, rather than being a unitary structure extending across the vehicle as shown. In this respect, for example, lower beam structure would comprise two longitudinal beams 15 on either side of the vehicle, with an intermediate beam 81 between them, but not extending across to the other pair of beams 15. There would then be provided for each beam structure a longitudinal beam 71, a pivot connection 69 and an axle connecting member 89 with two individual axle connecting beams 87. In this way, the transmission housing would not interfere with the structure. Of course, in this respect, if the transmission housing of the drive axle were of such a size that would allow for a differently constructed lateral beam 81, then only two beams 15 may become necessary with lateral beam 81 extending between them, but being shaped so as to avoid both the transmission housing and the drive shaft. While two beams 71 might therefore be necessary, additional lateral stability would be obtained through the unitizing from one side to the other of the vehicle of beam 81, rather than having two beams 81.

In order to avoid the transmission housing and/or drive shaft, it may also be necessary to reconstruct stabilizing beam structures 31, 35, 37 and 45 in a similar manner, so as to provide on either side of the vehicle the same structure, with beam 35 being split into two beams, so as to isolate position A from position B on two separate platforms 45. In this way, then, there would be provided four beams 31, two beams 35, two intermediate beams 37 and two beams 45. Stacking would still be appropriate under these conditions, and airbag stability, to an acceptable degree, would still be achievable.

The above description has been by way of illustration, rather than limitation, the scope and content of this invention being determined by the following claims:

We claim:

1. An axle suspension system for a frame membered, wheeled vehicle comprising as an interconnected set located on either side of said vehicle:
   a first beam, a second beam, a first expandable airbag, and a second expandable airbag;
   means for pivotally connecting the first beam to a frame member of the vehicle, means for connecting an axle to said first beam, and means for connecting a first expandable airbag to said first beam;
   means for connecting one end of a second expandable airbag to the frame member of the vehicle;
   said second airbag along located in stacked relationship with and above said first airbag such that said first and second airbags extend between said first beam and said frame member of said vehicle;
   said first and second airbags being connected by a stabilizing means comprising a lateral beam means connecting said first and second airbags together interconnecting said sets on either side of said vehicle, said second beam being connected to said lateral beam connecting means, said second beam being provided with means for pivotally connecting said beam to a frame member of said vehicle.

2. An axle suspension system according to claim 1 wherein said stabilizing means further comprises a resilient connection between said second beam and said lateral beam connecting means.

3. An axle suspension system according to claim 2 wherein said resilient connection includes two spaced apart resilient bushings.

4. An axle suspension system according to claim 3 wherein said resilient bushings are spaced apart in the longitudinal direction of the vehicle such that said bushings provide lateral stability and allow flexibility in the walk mode.

5. An axle suspension system according to claim 1 wherein said first beam is resiliently connected at one end to said frame member and has located along its length said first airbag and an axle, said first beam comprising first and second longitudinal beam members each provided at one end with means for resiliently connecting said beam member to a respective frame member of the vehicle, a beam member extending between said longitudinal beams, said beam member providing a platform upon which said first airbag resides; and an axle connecting means comprising a third longitudinal beam member connected at one end to an intermediate portion of said beam member and at the other end to said axle by an axle connection means which comprises a resilient pivotal bushing connected to a second lateral beam attached to said axle.

6. An axle suspension system according to claim 5 which further includes a fourth beam for connecting the upper end of said second airbag to a frame member of said vehicle, said fourth beam being rigidly connected at one end to said frame member and extending therefrom above the uppermost level of said frame member to a connection with said second airbag, such that said second airbag extends above the uppermost level of said frame member.

7. An axle suspension system according to claim 6 wherein said fourth beam extends in a direction which locates it rearwardly of said frame member when connected thereto.

8. An axle suspension system according to claim 5 wherein said stabilizing means comprises a lateral platform member providing at either end a connection for two sets of first and second airbags, and wherein said second beam comprises a pair of longitudinal beam-like members, each having at one end resilient bushing means for pivotally connecting said members to a respective frame of said vehicle, and being connected together at their other ends by a lateral beam-like member, said stabilizing means further comprising plate means connected at one end to said lateral beam-like member intermediate its ends, and at its other end to said lateral platform member by way of said spaced apart resilient bushings 9. An axle suspension system according to claim 8 which further includes a means for adjusting the caster of the axle of the vehicle, said means comprising, in combination with said first beam, means for pivotally connecting said first beam to a first portion of said axle, a radius rod pivotally connected at one end to said first beam and at the other end to a second portion of said axle, said radius rod being provided with means for adjusting its length; whereby adjustment of the length of said radius rod changes the caster of said axle.

10. In a wheeled vehicle having a pair of longitudinal frame members and at least two wheel bearing axle suspension systems connecting said wheels to said frame members, the improvement comprising as at least one of said wheel bearing axle suspension systems, the axle suspension systems of claims 1, 5, or 9.

11. The improvement of claim 10 wherein said suspension system is located in the tag position of said vehicle.

12. The improvement of claim 11 wherein said suspension system further includes a means for selectively raising and lowering the wheels out of and into engagement with the road surface.

13. The improvement of claim 12 wherein said axle is capable of being lifted above the lowermost plane of said frame members.

14. The improvement of claim 12 wherein said suspension is capable of safely carrying a load of about 14,000 lbs., and lifting said axle about 30 inches, and wherein said airbags have a nominal diameter of about 15 inches.

15. In a beam-type suspension system for connecting an axle to a longitudinal frame member of a wheeled vehicle which includes a beam pivotally connected at one end to its respective frame member of the vehicle and having located along its length an expandable airbag system for connection at its upper end to a respective frame member of the vehicle, and being provided with a means for connecting the axle to said beam, the improvement comprising:

first and second longitudinal beam members each provided at one end with means for resiliently connecting said beam to a respective frame member of the vehicle, a first lateral beam member extending between said longitudinal beams, said lateral beam member providing a platform upon which said airbag system resides; and an axle connecting means comprising a third longitudinal beam member connected at one end to an intermediate portion of said first lateral beam member and at the other end to said axle by an axle connection means which comprises a resilient pivotal bushing connected to a second lateral beam which is attached at spaced locations to said axle.

16. The improvement according to claim 15 which further includes a means for adjusting the caster of the axle of the vehicle, said means comprising in combination with at least one of said first and second longitudinal beam members, a radius rod pivotally connected at one end to said first or second beam member and at the other end to a portion of said axle different from that at which said means for connecting the beam to the axle contacts said axle, said radius rod being provided with means for adjusting its length, whereby adjustment of the length of said radius rod changes the caster of said axle.

17. In a wheeled vehicle having a pair of longitudinal frame members and at least two wheel bearing axle suspension systems connecting said wheels to said frame members, at least one of said wheel bearing axle suspension systems comprising a suspension system for connecting an axle to each of said frame members of said vehicle and for adjusting the caster of the axle of the vehicle, said system comprising a pair of beams, an axle connected to and extending between said beams, and means for pivotally connecting one end of each of said beams to its respective frame member of said vehicle, the improvement comprising:

an axle connecting member which includes means for connecting said beams to a first portion of said axle;

a radius rod pivotally connected at one end of each of said beams and at the other end to a second portion of said axle, at least one of said radius rods being provided with means for adjusting its length;

whereby adjustment of the length of an any one of said adjustable radius rods adjusts the caster of said axle.

18. In a beam-type suspension system for connecting an axle to a longitudinal frame member of a wheeled vehicle which includes a beam pivotally connected at one end to its respective frame member of the vehicle and having located along its length an expandable airbag system for connecting at its upper end to a respective frame member of the vehicle, and being provided with means for connecting the axle to said beam, the improvement comprising:

first and second longitudinal beam members each provided at one end with means for resiliently connecting said beam to a respective frame member of the vehicle, a first lateral beam member extending between said longitudinal beams, said lateral beam member forming a unitary C-shaped stabilizing structure which provides a platform upon which said airbag system resides; and an axle connecting means comprising beam means connected at one end to said C-shaped stabilizing structure and at the other end resiliently to said axle whereby said axle suspension system is laterally stable.

19. The improvement according to claim 18 wherein said axle suspension system is also roll flexible.

* * * * *